(12) United States Patent
Nakano

(10) Patent No.: US 7,194,178 B2
(45) Date of Patent: Mar. 20, 2007

(54) OPTICAL CONNECTOR INSERTION/EXTRACTION TOOL

(75) Inventor: Masakazu Nakano, Gotemba (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/081,592

(22) Filed: Mar. 17, 2005

(65) Prior Publication Data
US 2005/0207719 A1 Sep. 22, 2005

(30) Foreign Application Priority Data
Mar. 17, 2004 (JP) .............. P2004-076412

(51) Int. Cl.
*G02B 6/00* (2006.01)
*G02B 6/36* (2006.01)

(52) U.S. Cl. .................... 385/134; 385/147

(58) Field of Classification Search .............. None
See application file for complete search history.

(56) References Cited

U.S. PATENT DOCUMENTS

| 4,084,882 A | * | 4/1978 | Hogan et al. | 385/78 |
| 7,035,519 B2 | * | 4/2006 | Segroves et al. | 385/134 |
| 2003/0190133 A1 | * | 10/2003 | Adams | 385/134 |
| 2004/0101265 A1 | * | 5/2004 | Jong et al. | 385/134 |
| 2004/0218885 A1 | * | 11/2004 | Segroves et al. | 385/134 |
| 2005/0276560 A1 | * | 12/2005 | Reinert et al. | 385/134 |

FOREIGN PATENT DOCUMENTS

| JP | 11-119058 A | 4/1999 |
| JP | 2002-267882 A | 9/2002 |

* cited by examiner

*Primary Examiner*—Sung Pak
(74) *Attorney, Agent, or Firm*—Sughrue Mion, PLLC

(57) ABSTRACT

An optical connector insertion/extraction tool includes a body portion 2, opposed bar-like one and other arms 3 and 4 extending continuously from the body portion 2, a boot insertion space 5 formed between the one and other arms 3 and 4, an optical fiber escape space 6 formed between the one and other arms 3 and 4, a housing abutment surface 3*d* formed at least at an end surface of the first arm 3, and a claw portion 7 which extends forwardly from the second arm 4, and has a retaining-engaging portion 7*a* formed on an inner surface thereof.

6 Claims, 11 Drawing Sheets

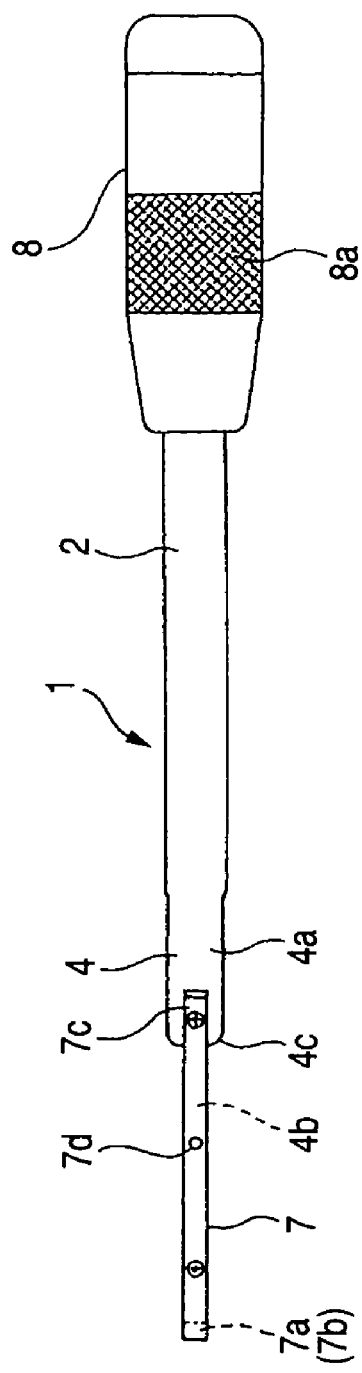
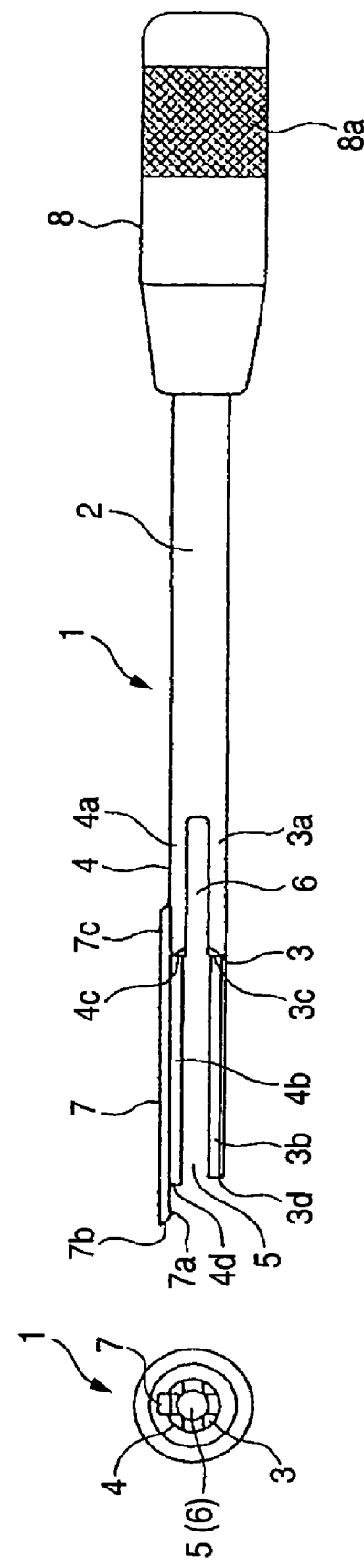
FIG. 2 (a)
FIG. 2 (b)
FIG. 2 (c)

OPTICAL CONNECTOR INSERTION/EXTRACTION TOOL

BACKGROUND OF THE INVENTION

1. Field of the Invention

This invention relates to a tool used for an optical connector having a lock portion, and more particularly to an optical connector insertion/extraction tool for inserting and extracting an optical connector relative to an adapter (mating fitting member).

2. Related Art

For inserting and extracting an optical connector relative to an adapter (mating fitting member), it is a common practice to effect the insertion and extraction with the hands. However, in order to mount optical connectors at a high density on a cabinet having a number of adapters, an optical connector insertion/extraction tool is required. Examples of conventional optical connector insertion/extraction tools include ones disclosed respectively in Japanese Unexamined Patent Publications 2002-267882 and Hei.11-119058.

In the conventional technique of Japanese Unexamined Patent Publication 2002-267882, a movable portion mechanism for inserting and extracting an optical connector is required, and therefore there is a problem that the tool-producing cost increases because of the provision of this mechanism, and another problem is that the means for preventing an optical fiber from being clamped must be additionally provided. In addition, the tool is of such a structure that its size is larger than the width of the optical connector, and therefore creates a problem that the tool size limits the connector mounting density.

On the other hand, in the conventional technique of Japanese Unexamined Patent Publication Hei.11-119058, a movable portion mechanism is not provided, and therefore the structure is simple. However, an optical connector-inserting portion and an optical connector-extracting portion are disposed at different ends of the tool, respectively, and therefore the following problems are encountered. Namely, one problem is that it is necessary to confirm the direction of use of the tool at the time of the operation, and this is troublesome. Another problem is that the tool can not be easily held with the hand since that portion of the tool which is not in use becomes a hindrance to this holding operation (The size of the tool must be increased so that the tool can be easily held with the hand). In addition, the tool is of such a structure that its size is larger than the width of the optical connector as in the conventional technique of Japanese Unexamined Patent Publication 2002-267882, and therefore creates a problem that the tool size limits the connector mounting density.

SUMMARY OF THE INVENTION

This invention has been made in view of the above circumstances, and an object of the invention is to provide an optical connector insertion/extraction tool which is simple in structure, and is inexpensive, and enables inserting and extracting operations to be effected easily by single end, and its small size contributes to the increase of the connector mounting density.

The above problems have been solved by an optical connector insertion/extraction tool of a first aspect of the present invention for use in association with an optical connector, wherein the optical connector, when inserted into an adapter, is locked thereto, so that the optical connector is completely attached to the adapter; and when a lock portion of the optical connector, attached to the adapter, is pressed down, the locked condition of the lock portion is canceled, so that the optical connector can be extracted from the adapter; provided in that the tool includes a body portion, opposed bar-like arm and other arms extending continuously from the body portion, a boot insertion space formed between the two arms, an optical fiber escape space formed between the two arms, a housing abutment surface formed at the end surface of the first arm, and a claw portion which extends forwardly from the second arm, and has a retaining-engaging portion formed on an inner surface thereof; and when the housing abutment surface is brought into abutting engagement with an end surface of the housing of the optical connector, the claw portion depresses the lock portion, and both retains and engages the lock portion, thereby holding the optical connector; and when the tool is turned in a held condition, the retaining engagement of the tool claw portion with the connector lock portion is released, and the depressed condition of the lock portion is canceled.

The optical connector insertion/extraction tool of a second aspect of the present invention, depending from the first aspect of the present invention, is provided in that an inner surface of the first arm which is in contact with the boot is curved.

The optical connector insertion/extraction tool of the invention of a third aspect of the present invention, depending from the first aspect or the second aspect of the present invention, is provided in that the end surface of the first arm and an end surface of the second arm are offset with respect to each other in a forward-rearward direction, and the end portion of the second arm serves as an abutment portion for abutting against the connector lock portion.

The optical connector insertion/extraction tool of the invention of a fourth aspect of the present invention, depending from any one of the first to third aspects of the present invention, is provided in that the claw portion is detachable from the second arm.

The optical connector insertion/extraction tool of the invention of a fifth aspect of the present invention, depending from any one of the first to fourth aspects of the present invention, is provided in that the portion of each of the first arm and the second arm, which is to be disposed rearwardly of an end of a tube member provided between an optical fiber and the boot, has a larger width than the portion of either the first arm or the second arm, which is to be disposed frontwardly of an end of a tube member provided between an optical fiber and the boot.

An optical connector insertion/extraction tool of the invention of a sixth aspect of the present invention, depending from any one of the first to sixth aspects of the present invention, is provided in that an outer surface of the claw portion is so disposed as to approximately coincide with an apex portion of the connector lock portion.

In the first aspect of the present invention, there is achieved an advantage that the optical connector insertion/extraction tool which is simple in construction can be provided. Since the tool is simple in construction, there is achieved an advantage that the optical connector insertion/extraction tool can be provided at a low cost. In addition, the optical connector-inserting portion and the optical connector-extracting portion are provided at the same end of the optical connector insertion/extraction tool, and an advantage is achieved that the optical connector insertion/extraction tool enables the operation to be carried out easily. Furthermore, the optical connector insertion/extraction tool is of such a structure that its size does not exceed the width of the optical connector, and therefore an advantage is achieved that the optical connector insertion/extraction tool can increase the connector mounting density.

In the second aspect of the present invention, the inner surface of the first arm is curved, and with this construction the area of contact of the housing abutment surface is increased. Therefore, there is achieved an advantage that the insertion of the optical connector into the adapter can be effected in a more stable manner.

In the third aspect of the present invention, the end surface of the first arm can be held against the housing end surface of the optical connector, while the end portion of the second arm can be held against the lock portion of the optical connector. Therefore, there is achieved an advantage that the insertion of the optical connector into the adapter can be effected in a more stable manner.

In the fourth aspect of the present invention, the claw portion can be replaceable. Therefore, if the operator drops the tool and/or if the claw portion has been damaged for any reason the tool can be easily repaired by replacing only the claw portion. Regarding on this function, an advantage is achieved that the optical connector insertion/extraction tool operational lifetime can be extended by replacing this inexpensive part.

In the fifth aspect of the present invention, the tube member will not interfere with the tool function, and therefore an advantage is achieved that the efficiency of the operation is enhanced. There is achieved another advantage that the first and second arms have sufficient rigidity.

In the sixth aspect of the present invention, the tool is of such a structure that its physical and functional size will not exceed the width or the height of the optical connector, and therefore an advantage is achieved that the connector mounting density can be further increased.

BRIEF DESCRIPTION OF THE DRAWINGS

FIG. 2A is a view of the optical connector insertion/extraction tool as seen from the upper side thereof;

FIG. 2B is a view of the tool as seen from the side thereof;

FIG. 2C is a view of the tool as seen from the front thereof;

DETAILED DESCRIPTION OF THE PREFERRED EMBODIMENTS

The present invention will now be described with reference to the drawings.

Figure 1:
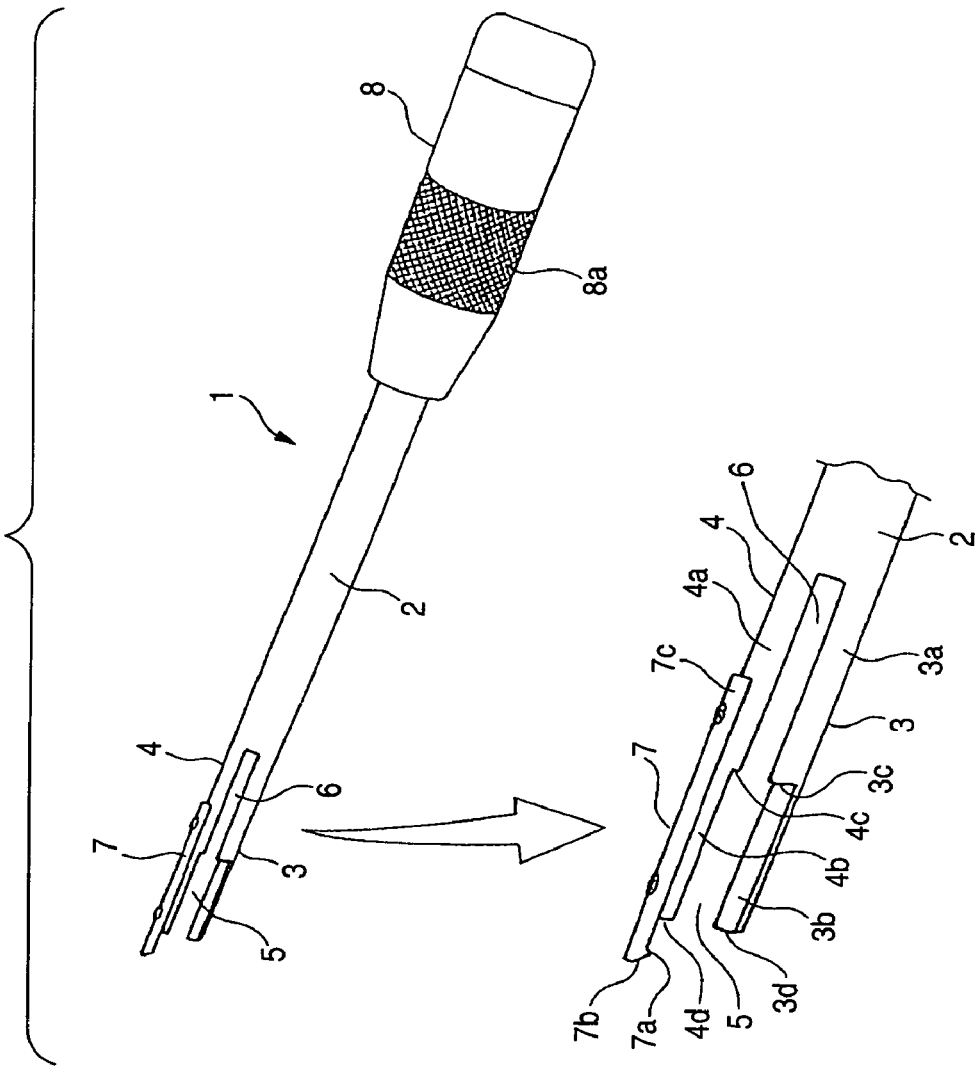
FIG. 1 is a perspective view of one preferred embodiment of an optical connector insertion/extraction tool of the invention.

FIG. 1 is a perspective view of one preferred embodiment of an optical connector insertion/extraction tool of the invention. FIG. 2A is a view of the optical connector insertion/extraction tool as seen from the upper side thereof, FIG. 2B is a view of the tool as seen from the side thereof, and FIG. 2C is a view of the tool as seen from the front thereof. FIGS. 3 to 8 are views explanatory of the procedure of extracting an optical connector, and FIGS. 9 to 13 are views explanatory of the procedure of inserting the optical connector.

In FIGS. 1 and 2, reference numeral 1 denotes the optical connector insertion/extraction tool of the invention. The optical connector insertion/extraction tool 1 of the invention is used for inserting and extracting an optical connector (for example, a known LC-type optical connector internationally standardized in IEC61754-20) relative to an adapter or any other (mating fitting member). This tool is not provided with any movable portion mechanism as used in the conventional example, and in addition, the inserting and extracting operations can be both effected with a single structural portion, and furthermore the tool is of such a physical and functional size that the space required for the inserting and extracting operations is minimized to the smallest practical space. Namely, the optical connector insertion/extraction tool 1 includes a body portion 2, a first arm 3 and a second arm 4 which are opposed to each other, a boot insertion space 5, a optical fiber escape space 6, and a claw portion 7.

The above portions 3 to 7 are provided at one end portion of the body portion 2 as shown in the drawings. A grip portion 8 is provided at the other end portion of the body portion 2. The provision of the grip portion 8 is arbitrary. In this embodiment, the grip portion 8 is provided in view of the operability. The construction of each portion will be described below.

In this embodiment, the body portion is made of SUS (stainless steel), and is formed into a hollow cylindrical shape, and has a suitable length (The body portion is not particularly limited to any specified shape or material). For a supplementary explanation, the cylinder made of SUS provides a sufficient rigidity for the tool, and also is more effective in reducing the weight and material cost as compared with a solid body. In this embodiment, a commercially-available pipe, which is made of SUS, and has inner and outer diameters suitably corresponding to the size of the optical connector and the size of a boot (described later), is used as the body portion 2.

The first arm 3 and the second arm 4 are formed in continuous relation to the one end of the body portion 2. Namely, the first arm 3 and the second arm 4 are formed integrally with the one end portion of the body portion 2. The first arm 3 as well as the second arm 4 is an approximately bar-shape portion extending forwardly from the one end of the body portion 2. The first arm 3 and the second arm 4 are formed by cutting the above SUS pipe. The second arm 4 is formed at the upper side so as to correspond to a lock portion (described later) of the optical connector. The first arm 3 is formed at the lower side opposite to the second arm 4.

The first arm 3 and the second arm 4 have their respective rigidity-securing portions 3a and 4a of a larger in width and guiding portions 3b and 4b. Namely, each of the first arm 3 and the second arm 4 is so shaped that its width is stepped. Step portions 3c and 4c of the first and the second arms 3 and 4 are so disposed as to be located rearwardly of an end of a tube member provided between an optical fiber (described later) and the boot.

The length of the first arm 3 and the length of the second arm 4 are determined, taking into consideration the optical performance of the optical fiber and connector unit. (so that the optical fiber will not be bent in excess of the manufacturer's recommendation). The optical fiber being led out through the optical fiber escape space 6. An inner surface of each of the one and other arms 3 and 4 is formed into a curved shape (It may be a V groove-shape. And, it may be a flat shape although the effect is reduced). These curved surfaces serve to guide the boot (described later), and also enables a turning operation described later. The curved surfaces further serve to increase the area of contact of a housing abutment surface 3d (described later) with the optical connector.

The housing abutment surface 3d is defined by an end surface of the first arm 3. The housing abutment surface 3d is adapted to abut against an end surface of a connector housing so as to contribute to the ease of insertion or extraction of the optical connector. An abutment portion 4d for abutting against a lock portion (described later) is defined by an end surface of the second arm 4. The abutment portion 4d, formed at the end of the second arm 4, contributes to the insertion of the optical connector, also serves to secure the stability of a held condition of the optical connector. The abutment portion 4d is disposed slightly forwardly of the housing abutment surface 3d (The abutment portion 4d and the housing abutment surface 3d can be disposed in a common plane perpendicular to the axis of the body portion 2 so that both of them can abut against the connector housing end surface).

The boot insertion space 5 and the optical fiber escape space 6 are continuous with each other, and are formed between the first arm 3 and the second arm 4, the optical fiber escape space 6 being disposed closer to the body portion 2. The boot insertion space 5 and the optical fiber escape space 6, respectively, are designed to accommodate the insertion of the boot and optical fiber (described later). In this embodiment, the boot insertion space 5 and the optical fiber escape space 6 are easily formed as a result of forming slits in the SUS pipe in order to form the first arm 3 and the second arm 4.

The claw portion 7 extends forwardly beyond the second arm 4, and has a bar-like shape. The claw portion 7 is separate from the second arm 4 (The claw portion 7 may be formed integrally with the second arm 4), and is fixed to the outer surface of the second arm 4 by screws or the like. A retaining-engaging portion 7a is formed on an inner surface of the claw portion 7. The retaining-engaging portion 7a is, for example, in the form of a projection of an approximately triangular cross-section. The retaining-engaging portion 7a is so disposed as to correspond to the connector lock portion (described later). In this embodiment, the retaining-engaging portion 7a is so disposed as to be retained and engaged with a groove portion or a projection (not shown) of a trigger guard (yoke) constituting the lock portion of the optical connector (The retaining-engaging portion 7a is not limited to such disposition, and its disposition can be suitably determined in accordance with the shape of the lock portion).

Although not shown in the drawings, an arcuate portion of a very small size is formed at each of opposite ends (spaced from each other in the direction of the width) of the retaining-engaging portion 7a. These arcuate portions are formed in order to enable the retaining-engaging portion 7a to be easily disengaged from the connector lock portion at the time of the turning operation (described later) and also to prevent damage to the optical connector surface. A tapering (slanting) surface 7b is formed at a front end of the claw portion 7. The tapering surface 7b slides on the lock portion so as to depress this lock portion. In this embodiment, a rear end portion 7c of the claw portion 7 extends to overlap the rigidity-securing portion 4a of the second arm 4 (With this arrangement, the rigidity of the claw portion 7 increases). A through hole 7d is formed through an intermediate portion of the claw portion 7. A positioning projection (not shown) on the second arm 4 is fitted in the through hole 7d (An operation for fixing the claw portion 7 can be carried out easily) The outer surface of the claw portion 7 is so disposed as to approximately coincide with an apex portion of the lock portion (Preferably, this outer surface is higher than the lock portion).

The grip portion 8 is to be held with the hand of the operator, and is mounted on the body portion 2 by suitable fixing means. A non-slip portion 8a is formed on the grip portion 8. By providing the grip portion 8, the operability and the efficiency of the operation can be enhanced. The grip portion 8 has an advantage that when the operator accidentally drops this tool on the floor, the grip portion 8 first strikes against the floor because of its weight, thereby reducing damage of the important portions of the tool.

Next, the operation of the optical connector insertion/extraction tool 1 of the invention, having the above construction, will be described (First, the optical connector and its associated members will be described, and then the operation will be described).

Figure 3:
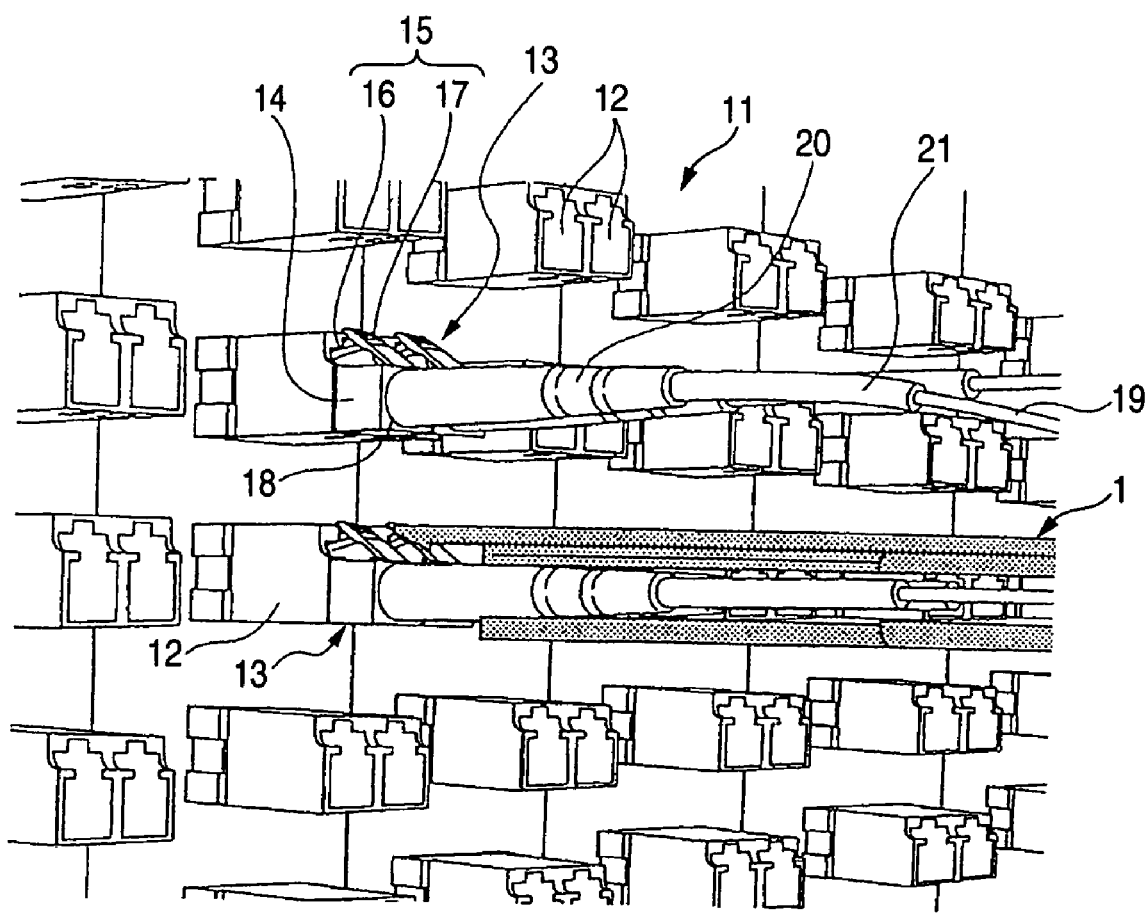
FIG. 3 is a view explanatory of the procedure of removing an optical connector, showing a condition in which the tool is moved along a boot from a rear side of the optical connector so as to effect a fitting operation.

In FIG. 3, a number of adapters 12 are provided at a cabinet 11. The optical connector 13 is inserted and fitted into the adapter 12, and is optically coupled thereto. The lock portion 15 is provided at an upper surface of the housing 14 of the optical connector 13. The lock portion 15 comprises a latching arm 16, for example, of a cantilever-like shape, and the cantilever-like trigger guard 17. The latching arm 16 and the trigger guard 17 are arranged such that a distal end portion of the trigger guard 17 overlaps a distal end portion (free end portion) of the latching arm 16. When the lock portion 15 is pressed down, the locked condition of the lock portion 15 relative to the adapter 12 is canceled. The known optical fiber 19 is led out from the rear end of the housing 4 (that is, the housing end surface 18). The amount of flexing (bending) of the optical fiber 19 is limited by the known boot 20 which is provided on the optical fiber to contact the housing end surface 18. The tube member 21 is provided between the boot 20 and the optical fiber 19 (The provision of the tube member 21 may be omitted).

Figure 4:
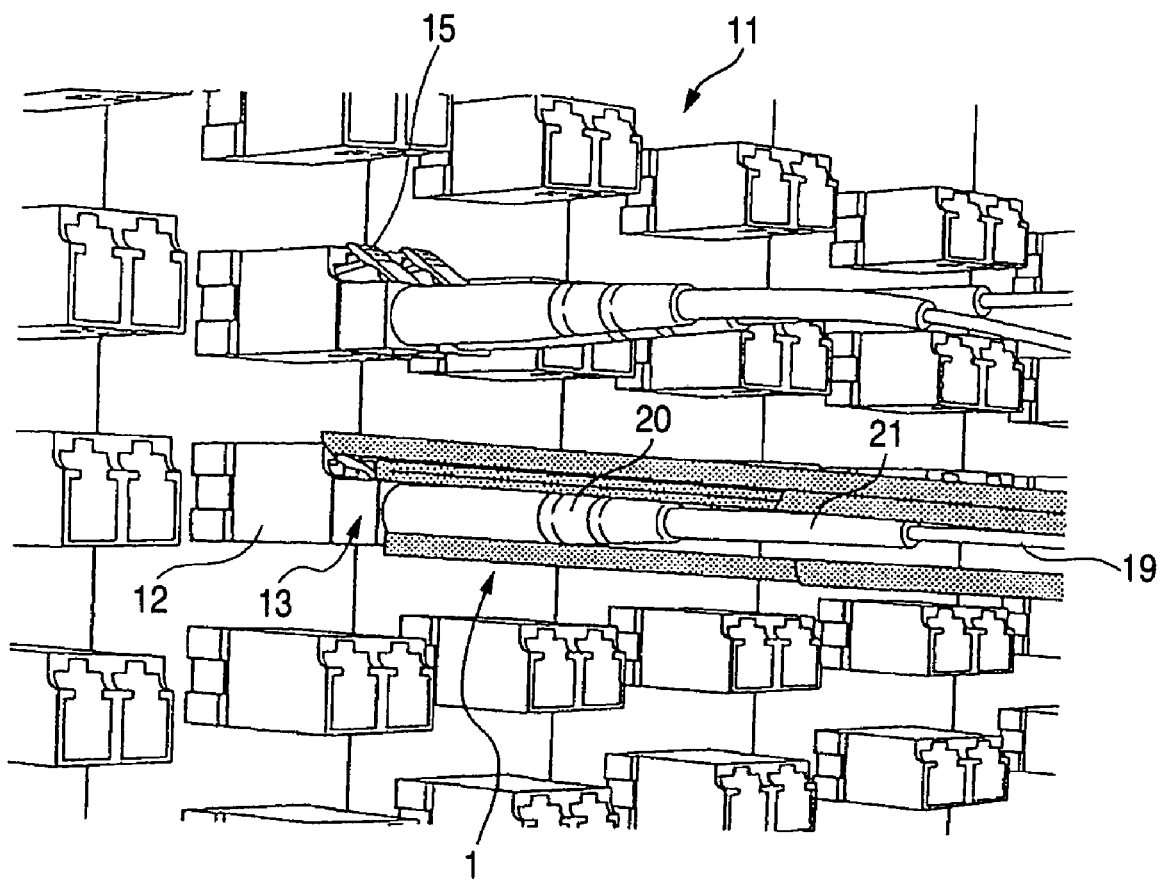
FIG. 4 is a view explanatory of the optical connector-extracting procedure, showing a condition in which the optical connector is pushed in the tool.
Figure 5:
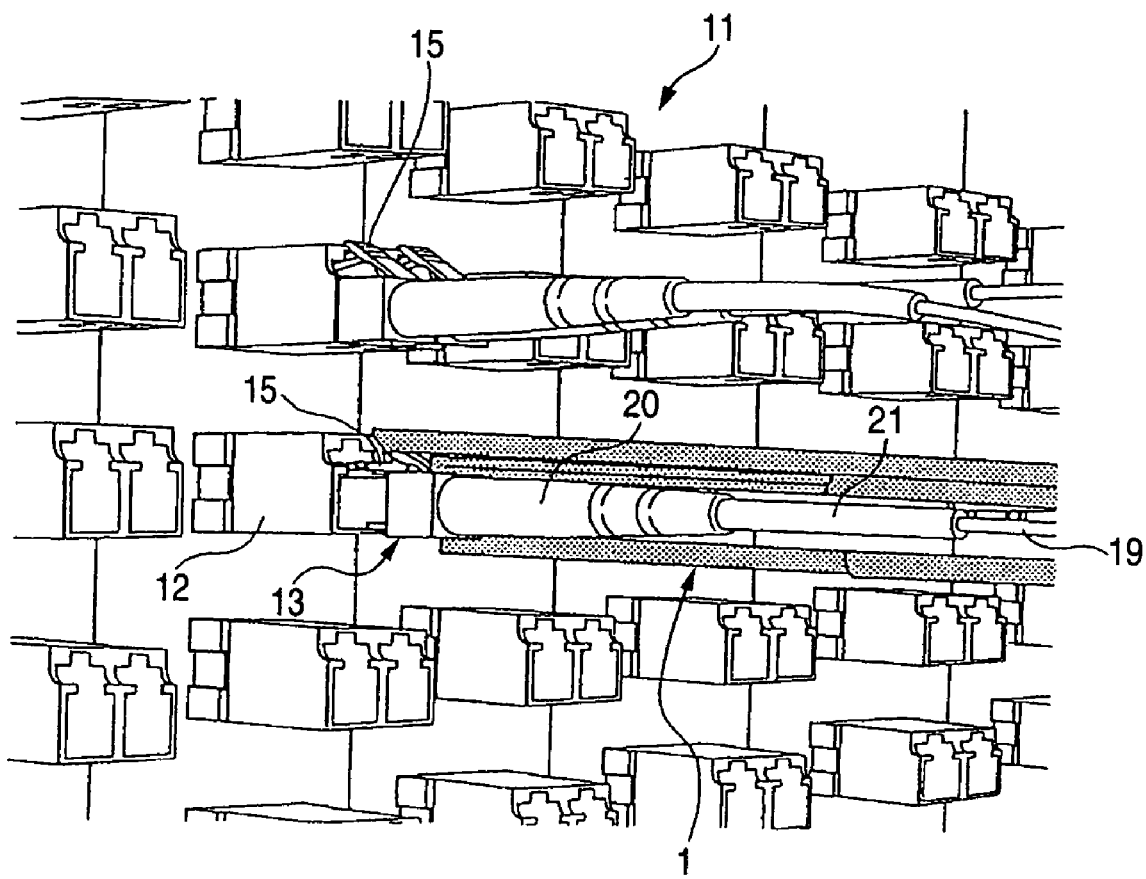
FIG. 5 is a view explanatory of the optical connector-extracting procedure, showing a condition in which the optical connector is extracted from an adapter.
Figure 6:
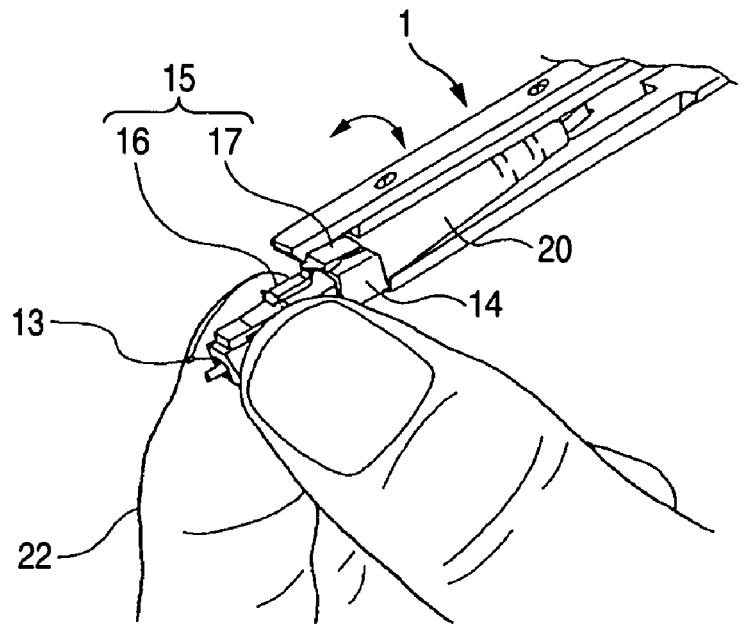
FIG. 6 is a view explanatory of the optical connector-extracting procedure, showing a condition in which the optical connector is to be turned and extracted from the tool by the hand.
Figure 7:
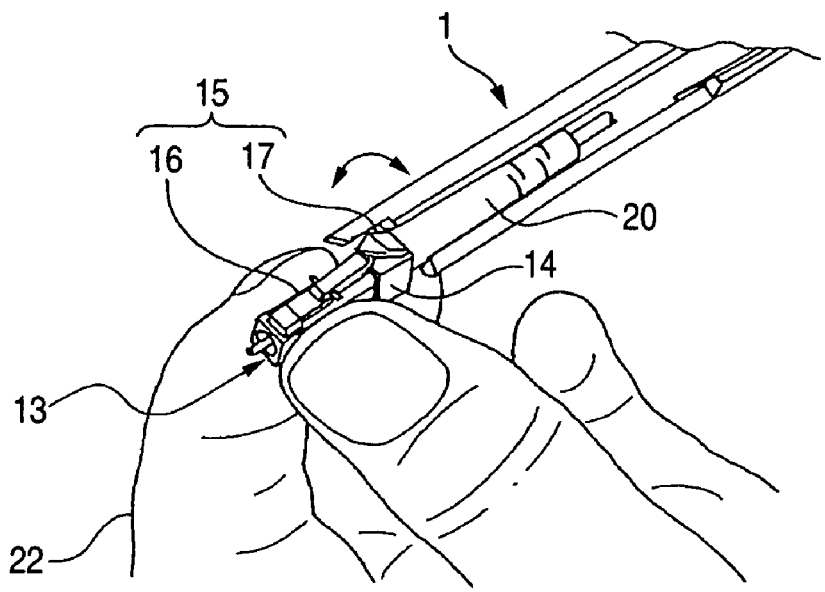
FIG. 7 is a view explanatory of the optical connector-extracting procedure, showing a condition immediately after the optical connector is turned and extracted from the tool by the hand.

For extracting the optical connector 13, first, the optical connector insertion/extraction tool 1 (indicated by fine dots in FIG. 3 so that its shape can be clearly recognized) is moved forward straight along the boot 20 from the rear side of the optical connector 13, with the claw portion 7 disposed at the upper side, so as to effect a fitting operation as shown in FIG. 3 (see FIGS. 1 and 2 with respect to the optical connector insertion/extraction tool 1). As a result, the boot 20 and the optical fiber 19 are inserted respectively into the boot insertion space 5 and the optical fiber escape space 6. When the optical connector insertion/extraction tool 1 is further moved, the claw portion 7 slides on the outer surface of the lock portion 15 to press it down as shown in FIG. 4. Then, the connector housing abutment surface 3d is brought into abutting engagement with the housing end surface 18, and the abutment portion 4d is brought into abutting engagement with a proximal end of the trigger guard 17. As a result, the optical connector 13 is held and supported by the optical connector insertion/extraction tool 1, and also the locked condition of the optical connector 13 relative to the adapter 12 is canceled. At this time, the optical connector insertion/extraction tool 1 holds and supports the optical connector 13 as if the optical connector 13 were pushed into the tool 1. Then, when the optical connector insertion/extraction tool 1 is moved rearward straight, the optical connector 13 is extracted from the adapter 12 as shown in FIG. 5. The optical connector 13, thus extracted from the adapter 12, is held, for example, by the fingers of the left hand of the operator as shown in FIGS. 6 and 7, and the optical connector insertion/extraction tool 1, held by the right hand (not shown), is turned in a direction of an arrow in these Figures (The tool may be turned in either of the left and right directions) to effect a turning removal operation, so that the optical connector is extracted from the tool as shown in FIG. 8.

Figure 8:
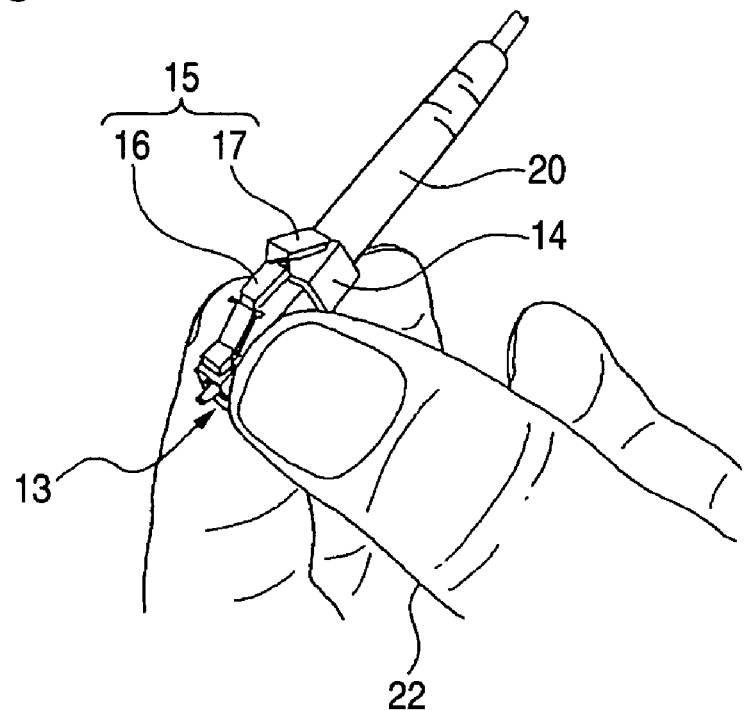
FIG. 8 is a view explanatory of the optical connector-extracting procedure, showing the optical connector extracted from the tool.
Figure 9:
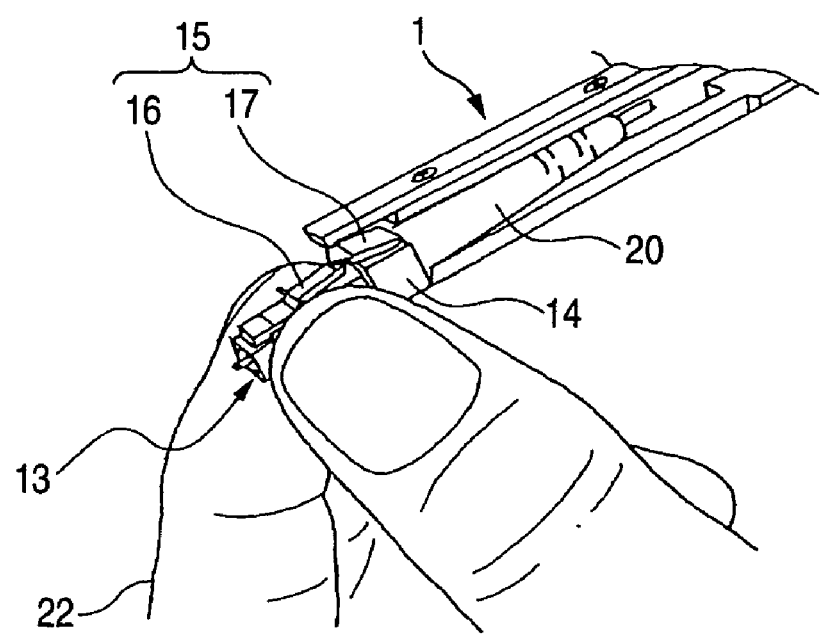
FIG. 9 is a view explanatory of a procedure of inserting the optical connector, showing a condition in which the tool is moved along the boot from the rear side of the optical connector so as to effect the fitting operation.
Figure 10:
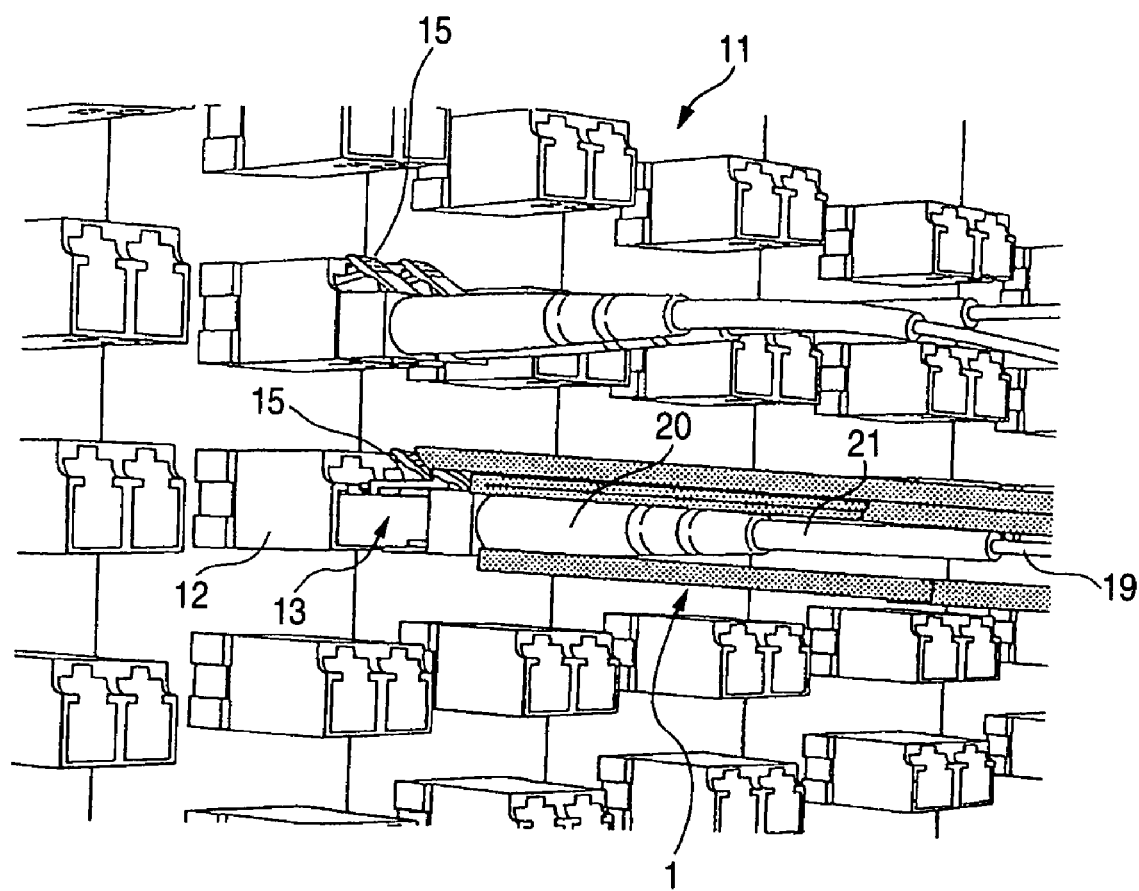
FIG. 10 is a view explanatory of the optical connector-inserting procedure, showing a condition in which the optical connector is to be inserted into the adapter.
Figure 11:
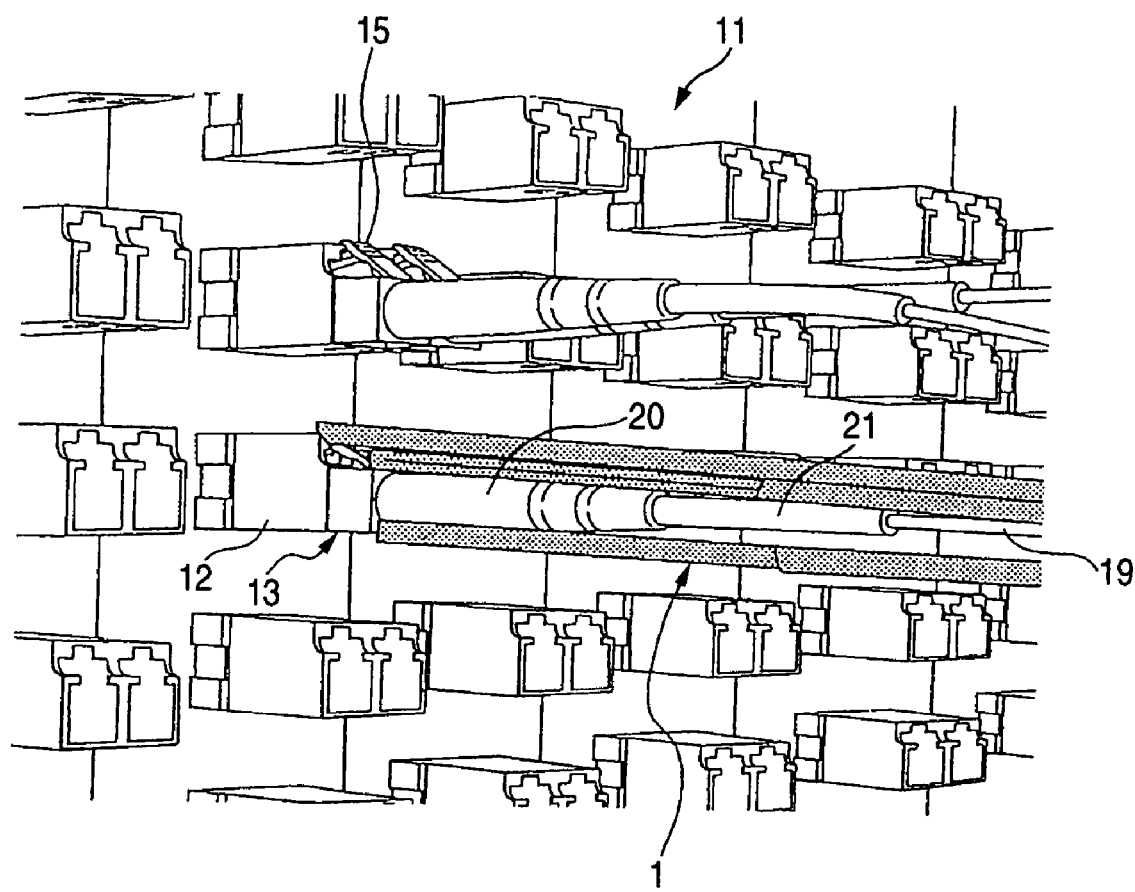
FIG. 11 is a view explanatory of the optical connector-inserting procedure, showing a condition in which the optical connector is pushed into the adapter through the tool.
Figure 12:
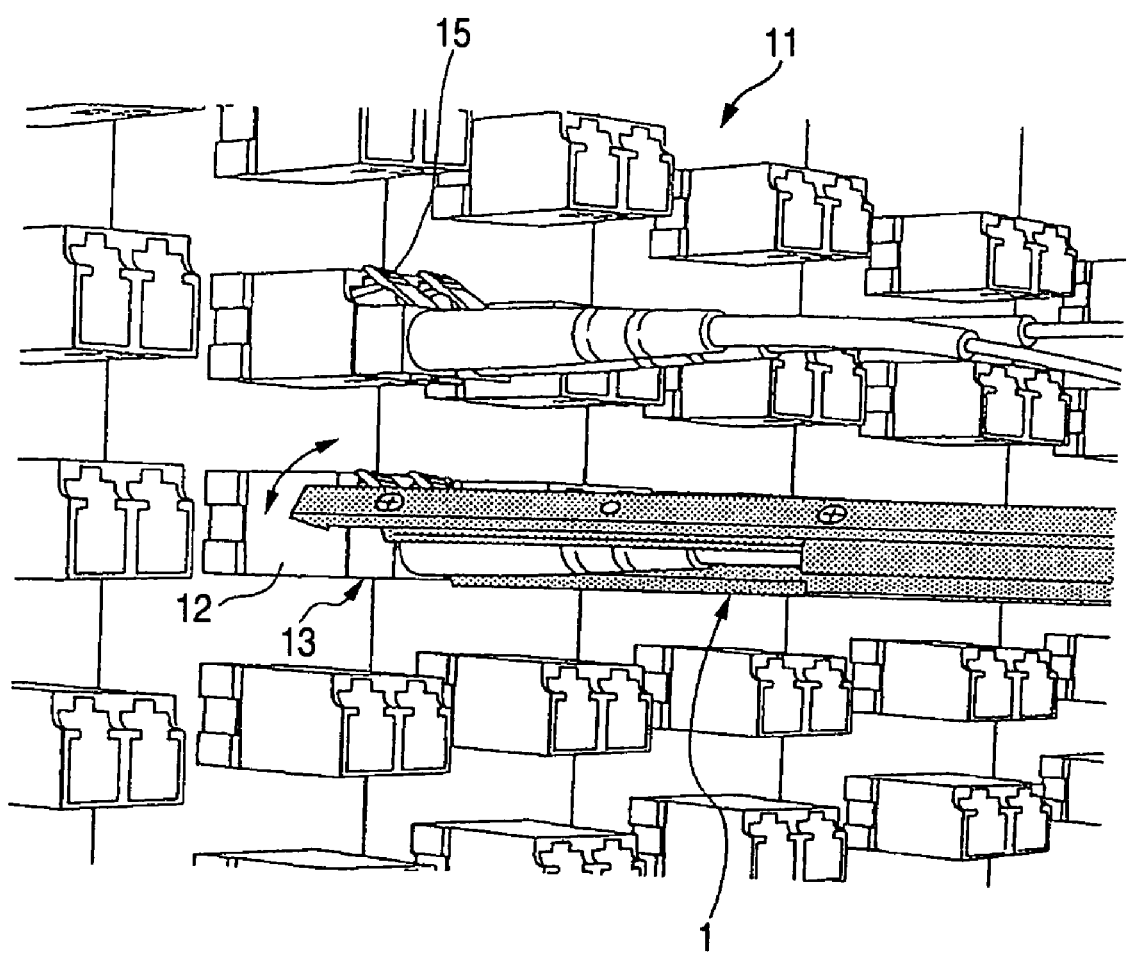
FIG. 12 is a view explanatory of the optical connector-inserting procedure, showing a condition in which the tool is turned, thereby canceling an engaged condition.
Figure 13:
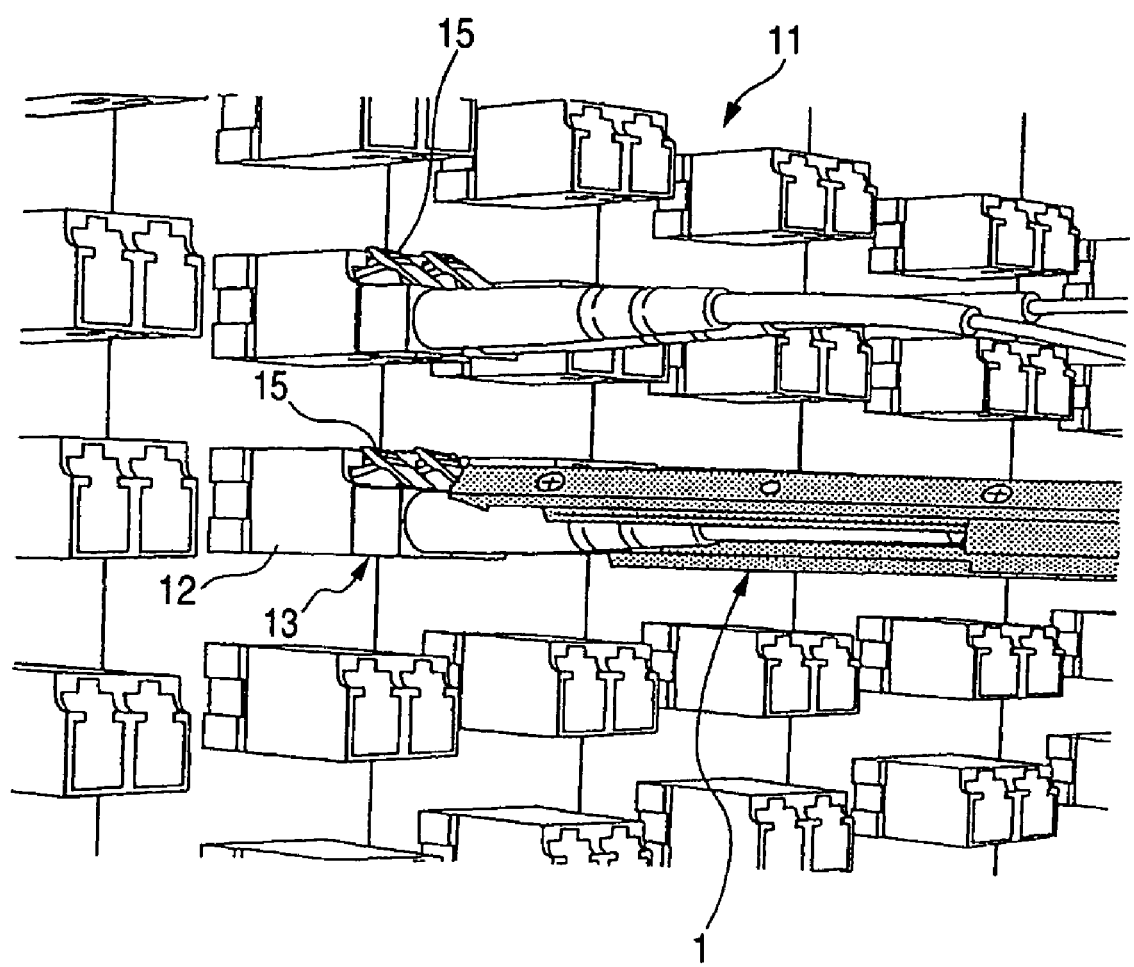
FIG. 13 is a view explanatory of the optical connector-inserting procedure, showing a condition in which the tool is extracted from the optical connector.

On the other hand, for attaching the optical connector 13 to the adapter 12, first, in the condition of FIG. 8, the optical connector insertion/extraction tool 1 is moved forward straight along the boot 20 from the rear side of the optical connector 13, with the claw portion 7 disposed at the upper side, so as to effect the fitting operation as shown in FIG. 9. As a result, the boot 20 and the optical fiber 19 are inserted respectively into the boot insertion space 5 and the optical fiber escape space 6. When the optical connector insertion/extraction tool 1 is further moved, the claw portion 7 depresses the lock portion 15. Then, the housing abutment surface 3d is brought into abutting engagement with the housing end surface 18, and the abutment portion 4d is brought into abutting engagement with the proximal end of the trigger guard 17. As a result, the optical connector 13 is held and supported by the optical connector insertion/extraction tool 1. Then, when the optical connector insertion/extraction tool 1, which is holding and supporting the optical connector 13, is moved forward straight toward the corresponding adapter 12, the optical connector 13 is inserted into the adapter 12 as shown in FIG. 10. When the optical connector 13 is further inserted into the adapter using the optical connector insertion/extraction tool 1, the optical connector 13 is completely pushed into the adapter 12 as shown in FIG. 11. In this condition, when the optical connector insertion/extraction tool 1 is turned in a direction of an arrow as shown in FIG. 12 (The tool may be turned in either of the left or right directions), the retaining engagement of the retaining-engaging portion 7a with the lock portion 15 is canceled, and the depressed condition of the lock portion 15 is canceled. Thus, the locking of the optical connector to the adapter 12 is completed. Thereafter, the optical connector insertion/extraction tool 1 is moved rearward straight, thus completing the attaching of the optical connector 13 to the adapter 12.

As described above with reference to FIGS. 1 to 13, the optical connector insertion/extraction tool 1 of the invention is simple in construction. Since the optical connector insertion/extraction tool 1 of the invention is thus simple in construction, it can be provided at a low cost. In addition, the optical connector-inserting portion and the optical connector-extracting portion are provided at the same location of the optical connector insertion/extraction tool 1 of the invention, and therefore the operation can be carried out easily. Furthermore, the physical and functional size of the optical connector insertion/extraction tool 1 will not exceed the width and height of the optical connector 13, and therefore the connector mounting density can be increased.

Various modifications of the above embodiment can be made without departing from the subject matter of the invention. The tool of the invention can be applied to any other suitable optical connector than the above optical connector 13 by slightly changing the shape of the claw portion 7 or by replacing the claw portion 7 with a suitable claw portion.

What is claimed is:

1. An optical connector insertion/extraction system wherein when said optical connector is inserted into an adapter, said optical connector is locked thereto so that the optical connector is completely attached to the adapter; and when a lock portion of the optical connector attached to the adapter is pressed down, a locked condition of the lock portion is released so that the optical connector can be extracted from the adapter, said system comprising:
   an optical connector insertion/extraction tool including:
   a body portion;
   a first and second arms extending continuously from said body portion in such a manner that said first arm and said second arm are confronted from each other;
   a boot insertion space and optical fiber escape space defined between said first and said second arms;
   a housing abutment surface formed at least at an end surface of said first arm; and
   a claw portion which extends forwardly from said second arm, and has a retaining-engaging portion formed on an inner surface thereof,
   wherein when said housing abutment surface is brought into abutting engagement with an end surface of a housing of said optical connector, said claw portion depresses said lock portion, and is retained and engaged with said lock portion so as to hold said optical connector,
   wherein when said tool is turned in a held condition of said optical connector, the retaining engagement of said claw portion with said lock portion is released, and the depressed condition of said lock portion is released, and
   wherein the end surface of said first arm and an end surface of said second arm are offset with respect to each other in a forward-rearward direction, and the end portion of said second arm serves as an abutment portion for abutting against said lock portion.

2. An optical connector insertion/extraction system wherein when said optical connector is inserted into an adapter, said optical connector is locked thereto so that the optical connector is completely attached to the adapter; and when a lock portion of the optical connector attached to the adapter is pressed down, a locked condition of the lock portion is released so that the optical connector can be extracted from the adapter, said system comprising:

an optical connector insertion/extraction tool including:

a body portion;

a first and second arms extending continuously from said body portion in such a manner that said first arm and said second arm are confronted from each other;

a boot insertion space and optical fiber escape space defined between said first and said second arms;

a housing abutment surface formed at least at an end surface of said first arm; and a claw portion which extends forwardly from said second arm, and has a retaining-engaging portion formed on an inner surface thereof, wherein when said housing abutment surface is brought into abutting engagement with an end surface of a housing of said optical connector, said claw portion depresses said lock portion, and is retained and engaged with said lock portion so as to hold said optical connector, wherein when said tool is turned in a held condition of said optical connector, the retaining engagement of said claw portion with said lock portion is released, and the depressed condition of said lock portion is released, and wherein each of said first arm and said second arm has a step portion such that a portion downstream from an end of a tube member provided between an optical fiber and a boot is larger in width than a portion upstream from the end of said tube member provided between said optical fiber and boot.

3. An optical connector insertion/extraction tool comprising:

a body portion;

first and second arms extending continuously from said body portion in such a manner that said first and said second arms are confronted from each other;

a boot insertion space and optical fiber escape space defined between said first arm and said second arm;

a housing abutment surface formed at least at an end surface of said first arm; and a claw portion which extends forwardly from said second arm, and has a retaining-engaging portion formed on an inner surface thereof, wherein the end surface of said first arm and an end surface of said second arm are offset with respect to each other in a forward-rearward direction, and the end portion of said second arm serves as an abutment portion for abutting against said lock portion.

4. An optical connector insertion/extraction tool comprising:

a body portion;

first and second arms extending continuously from said body portion in such a manner that said first and said second arms are confronted from each other;

a boot insertion space and optical fiber escape space defined between said first arm and said second arm;

a housing abutment surface formed at least at an end surface of said first arm; and a claw portion which extends forwardly from said second arm, and has a retaining-engaging portion formed on an inner surface thereof, wherein each of said first arm and said second arm has a step portion such that a portion downstream from an end of a tube member provided between an optical fiber and a boot is larger in width than a portion upstream from the end of said tube member provided between said optical fiber and boot.

5. An optical connector insertion/extraction system wherein when said optical connector is inserted into an adapter, said optical connector .is locked thereto so that the optical connector is completely attached to the adapter; and when a lock portion of the optical connector attached to the adapter is pressed down, a locked condition of the lock portion is released so that the optical connector can be extracted from the adapter, said system comprising:

an optical connector insertion/extraction tool including;

a body portion;

a first and second arms extending continuously from said body portion in such a manner that said first arm and said second arm are confronted from each other;

a boot insertion space and optical fiber escape space defined between said first and said second arms;

a housing abutment surface formed at least at an end surface of said first arm; and a claw portion which extends forwardly from said second arm, and has a retaining-engaging portion formed on an inner surface thereof, wherein when said housing abutment surface is brought into abutting engagement with an end surface of a housing of said optical connector, said claw portion depresses said lock portion, and is retained and engaged with said lock portion so as to hold said optical connector and, wherein when said tool is turned in a held condition of said optical connector, the retaining engagement of said claw portion with said lock portion is released, and the depressed condition of said lock portion is released, wherein the end surface of said first arm and an end surface of said second arm are offset with respect to each other in a forward-rearward direction, and the end portion of said second arm serves as an abutment portion for abutting against said lock portion.

6. An optical connector insertion/extraction system wherein when said optical connector is inserted into an adapter, said optical connector is locked thereto so that the optical connector is completely attached to the adapter; and when a lock portion of the optical connector attached to the adapter is pressed down, a locked condition of the lock portion is released so that the optical connector can be extracted from the adapter, said system comprising:

an optical connector insertion/extraction tool including:

a body portion;

a first and second arms extending continuously from said body portion in such a manner that said first arm and said second arm are confronted from each other;

a boot insertion space and optical fiber escape space defined between said first and said second arms;

a housing abutment surface formed at least at an end surface of said first arm; and a claw portion which extends forwardly from said second arm, and has a retaining-engaging portion formed on an inner surface thereof wherein when said housing abutment surface is brought into abutting engagement with an end surface of a housing of said optical connector, said claw portion depresses said lock portion, and is retained and engaged with said lock portion so as to hold said optical connector and, wherein when said tool is turned in a held condition of said optical connector, the retaining engagement of said claw portion with said lock portion is released, and the depressed condition of said lock portion is released, wherein each of said first arm and said second arm has a step portion such that a portion downstream from an end of a tube member provided between an optical fiber and a boot is larger in width than a portion upstream from the end of said tube member provided between said optical fiber and boot.

* * * * *